(139.)   2 Sheets—Sheet 1.

E. MATTESON.

Improvement in Propulsion of Vessels.

No. 122,624.   Patented Jan. 9, 1872.

Witnesses:
Henry N. Miller
C. L. Ewert

Inventor
Elisha Matteson
per
Alexander & Mason
Attorneys.

E. MATTESON

Improvement in Propulsion of Vessels.

No. 122,624

Patented Jan. 9, 1872.

Witnesses:
Henry N. Miller
C. L. Evert

Inventor
Elisha Matteson
per Alexander & Mason
Attorneys.

UNITED STATES PATENT OFFICE.

ELISHA MATTESON, OF NORWICH, CONNECTICUT, ASSIGNOR OF ONE-HALF HIS RIGHT TO AMASA C. HALL, OF SAME PLACE.

IMPROVEMENT IN PROPULSION OF VESSELS.

Specification forming part of Letters Patent No. 122,624, dated January 9, 1872.

*To all whom it may concern:*

Be it known that I, ELISHA MATTESON, of Norwich, in the county of New London and in the State of Connecticut, have invented certain new and useful Improvements in Apparatus for Propelling Boats; and do hereby declare that the following is a full, clear, and exact description thereof, reference being had to the accompanying drawing and to the letters of reference marked thereon making a part of this specification.

The nature of my invention consists in the construction and arrangement of an apparatus for propelling boats of any kind or description, as will be hereinafter more fully set forth.

In order to enable others skilled in the art to which my invention appertains to make and use the same, I will now proceed to describe its construction and operation, referring to the annexed drawing, in which—

Figure 1:
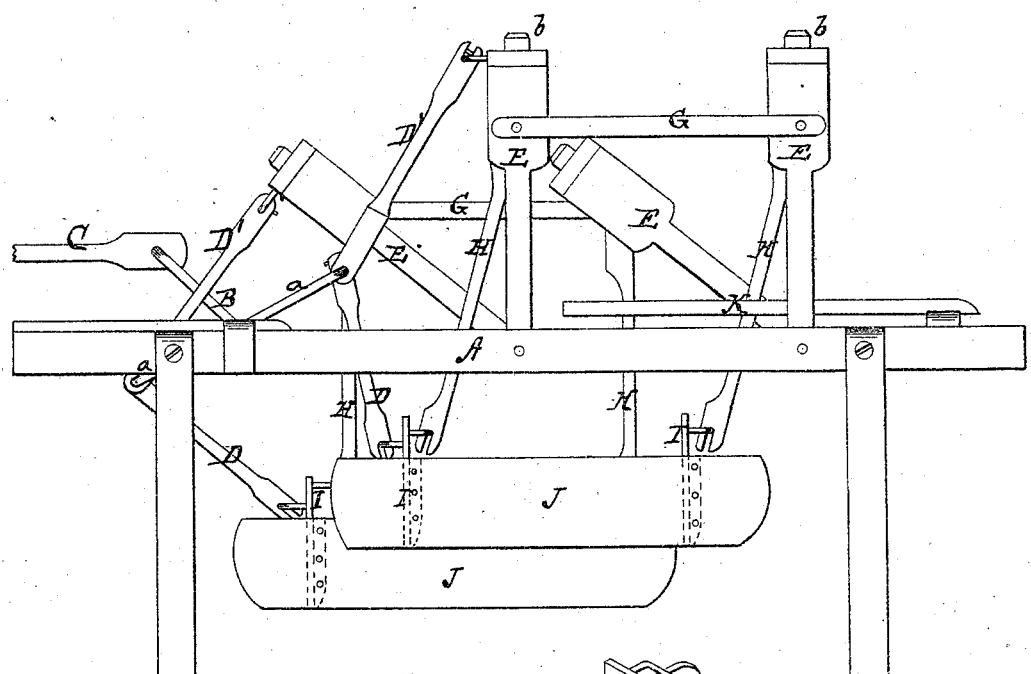
Figure 3:
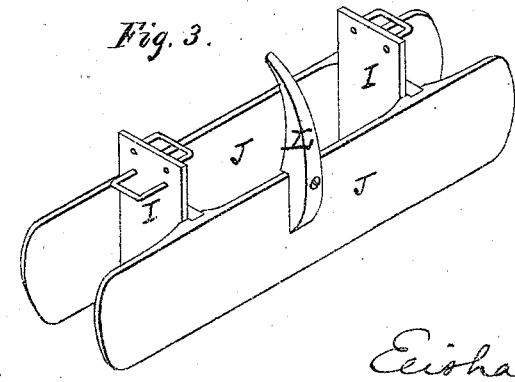
Figure 2:
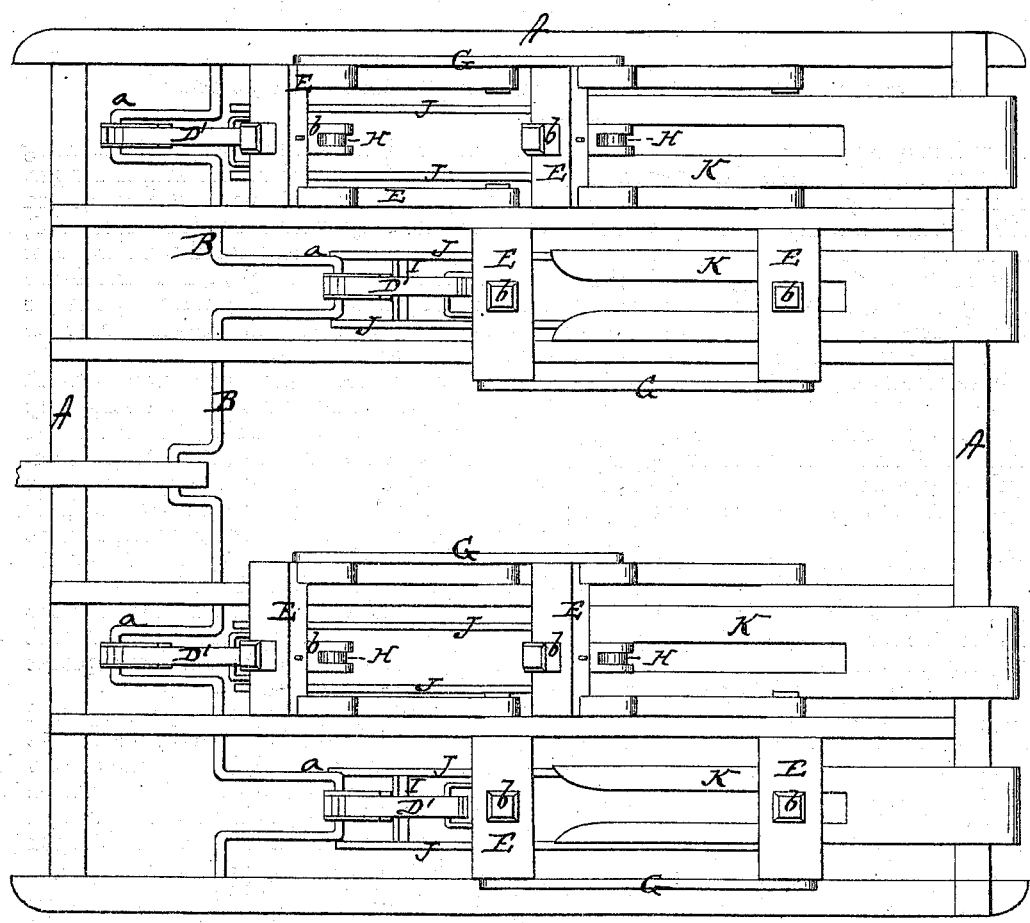

Figure 1 is a side view, and Figure 2 a plan view of my apparatus. Figure 3 is a perspective view of one of the paddles with a guard attached.

A represents the frame in which my propelling apparatus is arranged. In suitable boxes across one end of this frame is placed a crank-shaft, B, to the center crank of which the pitman C from the engine is connected so as to revolve said shaft. Any desired number of cranks, *a a*, may be on this shaft, but they should be arranged alternately in opposite directions, as shown in Fig. 2. From each one of these cranks *a a* two pitmen, D and D', extend, the former direct to the paddle and the latter to an apparatus connected with the same. The pitman D' connects with a frame, E, pivoted at its lower end to the frame A, the pitman being attached at the upper end of said pivoted frame. The frame E is by a pivoted bar or rod, G, connected with one, two, or more similar frames, E, arranged in a line and pivoted at their lower ends to the main frame A. In the upper end of each of these frames is a downward-projecting arm, *b*, which is made adjustable up and down for a purpose that will be hereinafter described. The lower end of this arm within the frame is forked, and in the same is pivoted a bar or hanger, H, the lower end of which is attached to a paddle, I, or rather the paddle is hung loosely on the lower end of said arm or hanger. All the paddles of each series are connected and protected by means of side pieces J J, and the pitman D is connected with the rear paddle, as shown. On the main frame A are secured forked or slotted guides K, one for each series of frames and hangers, in which guides said hangers move.

It will be noticed that when the crank-shaft B revolves the paddles are raised straight up out of the water, then carried forward above the water, and then again raised still further, when they are plunged suddenly down into the water and drawn quickly backward. This movement is caused by the combination of the pitmen D D' and pivoted frames E E with their swinging hangers H H.

If desired, guards L may be attached to the side pieces J J to prevent ice or other drift matter from coming in between said side pieces and between the paddles.

This propelling apparatus may be applied to any boat or vessel for navigation on the ocean, lakes, canals, or shallow streams, and it may be applied either at the stern or sides of the boat. When applied at the stern of a canal-boat the main frame A may be hinged at its front end, so as to be thrown up when passing through the locks of the canal. In like manner when applied to the sides of the boat the main frames should be hinged at the inner sides for the same purpose.

By adjusting the arms *a a* up and down in the frames E E the paddles I I may be raised and lowered at will, so as to regulate their descent into the water, which is of the utmost importance, as the cargoes of boats and vessels are sometimes heavier and at other times lighter. The side pieces J J, which connect the paddles I I, also prevent any side swell of the water, and thus prevent any injury to the banks of the canal by the washing of the water.

Having thus fully described my invention, what I claim as new, and desire to secure by Letters Patent, is—

1. The combination of the paddles I I, side pieces J J, and guards L, substantially as and for the purposes herein set forth.

2. The combination of the pivoted frames

E E, connected by the bar G, the swinging hangers H H, paddles I I, and pitmen D D', said pitmen being operated from the same crank on the operating crank-shaft, substantially as and for the purposes herein set forth.

3. The combination of the frames E, adjustable arms $b$, swinging hangers H H, substantially as and for the purposes herein set forth.

In testimony that I claim the foregoing I have hereunto set my hand this 6th day of November, 1871.

ELISHA MATTESON.

Witnesses:
  A. N. MARR,
  EDM. F. BROWN.

(139)